2,948,752

COMBINED FUNGISTATIC AND BACTERIOSTATIC AGENTS

Ctirad Podesva, Montreal, Quebec, and Arthur F. McKay, Quebec, Quebec, Canada, assignors to Monsanto Canada Limited, La Salle, Quebec, Canada No Drawing. Filed May 18, 1959, Ser. No. 813,697

7 Claims. (Cl. 260—552)

This invention relates to a new class of urea and thiourea derivatives and to bacteriostatic and fungicidal compositions in which they are active constituents.

The urea and thiourea derivatives of the invention have the general formula

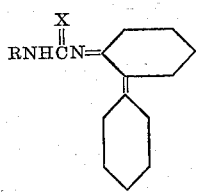

in which X is selected from the group consisting of S and O and R is selected from the group consisting of H, alkyl, alkenyl, aryl and aralkyl radicals and their corresponding negatively substituted radicals, for example chloro, bromo or nitro substituted. In this definition alkyl is intended to include cycloalkyl and alkenyl to include cycloalkenyl. Preferred compounds are 1(2-cyclohexylidene-cyclohexylidene)-3-allyl-urea
1(2 - cyclohexylidene-cyclohexylidene) - 3 - ($\Delta^1$ - cyclohexenyl)-urea
1(2-cyclohexylidene-cyclohexylidene)-3-phenyl-urea
1(2-cyclohexylidene-cyclohexylidene)-thiourea
1(2-cyclohexylidene-cyclohexylidene)-3-allyl-thiourea For bacteriostatic and fungicidal use the active substances of the invention are preferably compounded physically with suitable carriers.

In a preferred composition, the active substance in amounts from about 2% to about 20% by weight is incorporated in a water-miscible greaseless base ointment. This ointment is useful for topical applications in the treatment of skin areas affected by bacteria and fungi.

Other formulations of the active substance in carriers to form solid, liquid, creamy or pasty substances are within the purview of the invention. For convenience the word "carrier" is used to denote an acceptable substance or formulation physically compounded with the active agent to assist its application in the treatment of bacterial and fungal infections. The composition may also contain other active ingredients.

To prepare an ointment the active substance may be incorporated with the base ointment as the carrier and the mixture put through a roller type ointment mill. Other methods of formulations will be clear to those skilled in the art.

The bacteriostatic activity of compounds according to the invention against both gram positive and gram negative organisms are comparable with the sulfa drugs. They also possess fungicidal activity when tested against Candida albicans, Trichophytum granulosum and Microsporum gypseum. Moreover, these compounds possess very low acute toxicity. The $L_D50$ of the compounds tested in mice by intraperitoneal injection is greater than 1 gram per kilogram. The bacteriostatic and fungicidal activity is associated mainly with the 2-cyclohexylidene-cyclohexylidene group. Variations in the other substituents represented by R in the above formula have minor effects on the bacteriostatic and fungicidal activity. In general the effective bacteriostatic concentration of these products varies from 0.025 mg./ml. to 0.1 mg./ml.

The compounds of the invention are prepared by condensing a free or substituted urea or thiourea with from one to ten molar equivalents of cyclohexanone or cyclohexylidene cyclohexanone at any temperature between room temperature and reflux temperature. The condensations may be carried out in the presence or absence of solvents, or an excess of the ketone may be used as solvent. The condensation may be carried out under acid, neutral or alkaline conditions, preferably it is performed in the presence of a mineral acid, for example, hydrochloric acid, desirably at a concentration from ten to one hundred moles percent. Generally the reaction may be completed under reflux in from ½ to 3 hours. The progress of the condensation may be readily determined by observing the amount of crystalline material formed, or by measuring the amount of water formed in the reaction etc. The crystalline products which form are isolated from the cooled reaction solution by filtration or centrifugation, and, if necessary, purified by known methods, for example by crystallization from a suitable solvent.

The following examples of preferred procedures will serve to illustrate the invention further and are not intended to limit the scope of the invention.

EXAMPLE I

*1-(2-cyclohexylidene-cyclohexylidene) thiourea*

Thiourea (72 parts), cyclohexanone (98 parts), and concentrated hydrochloric acid (100 parts) were refluxed together for 45 minutes and then left standing overnight. After dilution with ethanol the formed crystals were filtered off, washed with ethanol and recrystallized from chloroform. An excellent yield of 1-(2-cyclohexylidene-cyclohexylidene) thiourea, melting in an evacuated capillary tube at 274–276° C., was obtained.

This new compound gave an analysis 65.66% carbon, 8.18% hydrogen, 11.84% nitrogen and 13.65% sulfur, as compared with the theoretical calculated for $C_{13}H_{20}N_2S$ of 66.05% carbon, 8.53% hydrogen, 11.86% nitrogen and 13.56% sulfur. The same product was obtained in a similar yield when concentrated hydrochloric acid was replaced by catalytic amounts of sodium hydroxide or triethanolamine.

EXAMPLE II

*1-(2-cyclohexylidene-cyclohexylidene) urea*

Urea (6 parts), 2-cyclohexylidene cyclohexanone (17.8 parts) and concentrated hydrochloric acid (10 parts) were refluxed together for two hours. Some ethanol was then added, the formed crystals separated, washed with ethanol, then with 1% solution of sodium hydroxide and finally with water. A good yield of a white crystalline material was obtained, which melted after recrystallization from ethanol at 234–235° C. and was identified as 1-(2-cyclohexylidene-cyclohexylidene) urea.

This new compound on analysis gave 71.10% carbon, 9.18% hydrogen and 12.56% nitrogen, as compared with the thoretical calculated for $C_{13}H_{20}N_2O$ of 70.95% carbon, 9.16% hydrogen and 12.73% nitrogen.

EXAMPLE III

*1-(2-cyclohexylidene-cyclohexylidene) thiourea*

Thiourea (7.2 parts), 2-cyclohexylidene-cyclohexanone (17.8 parts) and concentrated hydrochloric acid (10 parts) were refluxed together for one hour. A large amount of crystals separated during the reflux period. The reaction mixture was diluted with ethanol and the product isolated as in Example I. The pure product melted at 274–276° C. in the evacuated capillary. A mixed melting point determined with the product of Example I showed no depression. This product on analysis gave 65.88% carbon, 8.48% hydrogen, 11.74% nitrogen and 13.21% sulfur as compared with the theoretical shown in Example I.

EXAMPLE IV

1-ethyl-3-(2-cyclohexylidene-cyclohexylidene) urea

Ethyl urea (8.8 parts), cyclohexanone (19.6 parts) and concentrated hydrochloric acid (10 parts) were refluxed together for 30 minutes. After cooling the crystallization of the product was initiated by the addition of aqueous ethanol. An excellent yield of white crystalline material was separated, which melted after recrystallization from aqueous ethanol at 164–167° C. and which was identified as 1-ethyl-3-(2-cyclohexylidene-cyclohexylidene) urea.

This new compound on analysis gave 72.48% carbon, 9.76% hydrogen and 11.56% nitrogen as compared with the theoretical calculated for $C_{15}H_{24}N_2O$ of 72.5% carbon, 9.74% hydrogen and 11.28% nitrogen.

EXAMPLE V

1-($\Delta^1$-cyclohexenyl)-3-(2-cyclohexylidene-cyclohexylidene) urea

Urea (60 parts), cyclohexanone (98 parts) and concentrated hydrochloric acid (100 parts) were refluxed together for 90 minutes. During this period the reaction mixture separated into two layers. After cooling the aqueous layer was decanted, and the rest of the water and some cyclohexanone removed from the organic layer by vacuum distillation. The remaining oil was diluted with 25 cc. of ethanol and the solution then stirred into 400 cc. of water. This aqueous dispersion was carefully neutralized to pH about 8.0 with diluted sodium hydroxide. During the neutralization the oily material solidified to white crystalline product which after several washings with water melted at 198–200° C. After two recrystallizations from ethanol-benzene mixture an excellent yield of 1-($\Delta^1$-cyclohexenyl)-3-(2-cyclohexylidene-cyclohexylidene) urea melting at 242–244° C. was obtained.

This new compound on analysis gave 75.62% carbon, 9.40% hydrogen and 9.14% nitrogen, as compared with the theoretical calculated for $C_{19}H_{28}N_2O$ of 75.96% carbon, 9.39% hydrogen and 9.33% nitrogen. The same product was obtained in an equally good yield when the same proportions of urea, cyclohexanone and hydrochloric acid were left standing for 5 days at room temperature.

EXAMPLE VI

1-phenyl-3-(2-cyclohexylidene-cyclohexylidene) urea

Phenylurea (34 parts), cyclohexanone (98 parts) and concentrated hydrochloric acid (25 parts) were refluxed togethere for 90 minutes. After cooling and careful neutralization with diluted sodium hydroxide the aqueous layer was decanted and the organic layer washed several times with water. Ethanol (100 parts) was then added to the oily material and the product was allowed to crystallize overnight. A high yield of fine white crystals was separated melting after one recrystallization from chloroform at 233° C. and identified as 1-phenyl-3-(2-cyclohexylidene-cyclohexylidene) urea. This new compound gave on analysis the values of 76.78% carbon, 8.24% hydrogen and 9.49% nitrogen, as compared with the theoretical calculated for $C_{19}H_{24}N_2O$ of 76.99% carbon, 8.16% hydrogen and 9.45% nitrogen.

EXAMPLE VII

1-phenyl-3-(2-cyclohexylidene-cyclohexylidene) thiourea

Phenylthiourea (76 parts), cyclohexanone (98 parts) and concentrated hydrochloric acid (50 parts) were refluxed together for one hour. The reaction mixture was poured into water (ca. 250 parts), the suspension neutralized with dilute sodium hydroxide, the aqueous layer decanted and the oily layer poured slowly into cold ethanol (ca. 200 parts). The product crystallized almost immediately. The white crystalline product obtained in high yield melted after recrystallization from ethanol-benzene mixture at 195–197° C. with decomposition and was identified as 1-phenyl-3-(2-cyclohexylidene-cyclohexylidene) thiourea. This new compound, on analysis gave 73.32% carbon, 7.93% hydrogen, 9.13% nitrogen and 9.69% sulfur, as compared with the theoretical calculated for $C_{19}H_{24}N_2S$ of 73.03% carbon, 7.74% hydrogen, 9.87% nitrogen and 10.26% sulfur.

EXAMPLE VIII

1-(4-chlorophenyl)-3-(2-cyclohexylidene-cyclohexylidene) urea 4-chlorophenylurea (17.5 parts), cyclohexanone (49 parts) and concentrated hydrochloric acid (10 parts) were refluxed together for ninety minutes and then left standing at room temperature overnight. A high yield of white crystalline material was thus obtained. The crystals were separated by filtration and washed with several small portions of ethanol. This material melted after one recrystallization from ethanol-benzene mixture at 241–243° C. and was identified as 1-(4-chlorophenyl)-3-(2-cyclohexylidene-cyclohexylidene) urea. This new compound on analysis gave 68.94% carbon, 6.99% hydrogen, 8.66% nitrogen and 10.80% chlorine, as compared with the theoretical calculated for $C_{19}H_{23}N_2OCl$ of 68.97% carbon, 7.01% hydrogen, 8.47% nitrogen and 10.72% chlorine.

EXAMPLE IX

1-(4-chlorophenyl)-3-(2-cyclohexylidene-cyclohexylidene) thiourea 4-chlorophenylthiourea (18.7 parts), 2-cyclohexylidene-cyclohexanone (17.8 parts) and concentrated hydrochloric acid (10 parts) were refluxed together for one hour. After cooling and addition of ethanol the white crystals resulting from the reaction were separated by filtration. The product obtained in high yield melted after recrystallization from ethanol at 212–214° C. and was identified as 1-(4-chlorophenyl)-3-(2-cyclohexylidene-cyclohexylidene) thiourea. This new compound gave on analysis 65.81% carbon, 6.61% hydrogen, 8.36% nitrogen, 8.92% sulfur and 10.00% chlorine, as compared with the theoretical calculated for $C_{19}H_{23}N_2SCl$ of 65.78% carbon, 6.68% hydrogen, 8.08% nitrogen, 9.24% sulfur and 10.22% for chlorine.

EXAMPLE X

1-(4-chlorphenyl)-3-(2-cyclohexylidene-cyclohexylidene) thiourea 4-chlorophenylthiourea (18.7 parts), cyclohexanone (49 parts) and concentrated hydrochloric acid (10 parts) were refluxed together for two hours. After cooling the oily reaction product was suspended in water, neutralized with dilute sodium hydroxide, decanted from the aqueous portion and after addition of some ethanol allowed to crystallize. A high yield of white crystals was obtained. These crystals melted after two recrystallizations from ethanol at 212–214° C. and their identity with the product described in Example IX was confirmed by a mixed melting point determination. This compound on analysis gave 65.76% carbon, 6.66% hydrogen, 8.35% nitrogen, 8.84% sulfur and 9.85% chlorine, as compared with the theoretical calculated for $C_{19}H_{23}N_2SCl$ of 65.78% carbon, 6.68% hydrogen, 8.08% nitrogen, 9.24% sulfur and 10.22% chlorine.

EXAMPLE XI

*1 - (4 - hydroxyphenyl) - 3 - (2 - cyclohexylidene - cyclohexylidene) urea*

4-hydroxyphenylurea (15.2 parts), cyclohexanone (49 parts) and concentrated hydrochloric acid (10 parts) were stirred at reflux temperature for seven minutes. The crystals, formed in a very high yield during the reaction, were collected on a Buchner funnel, washed with ethanol and dried. After two recrystallizations from ethanol they melted at 268–269° C. and were identified as 1 - (4 - hydroxyphenyl) - 3 - (2 - cyclohexylidene - cyclohexylidene) urea. This new compound on analysis gave 73.02% carbon, 7.71% hydrogen and 8.96% nitrogen as compared with the theoretical calculated for $C_{19}H_{24}N_2O_2$ of 73.05% carbon, 7.74% hydrogen and 8.97% nitrogen.

EXAMPLE XII

*1 - (3,4 - dichlorobenzyl) - 3 - (2 - cyclohexylidene - cyclohexylidene) urea*

3,4-dichlorobenzylurea (10.25 parts), 2-cyclohexylidene-cyclohexanone (17.8 parts) and concentrated hydrochloric acid (5 parts) were kept at reflux temperature for 45 minutes. A large crop of white crystals formed during the reaction. They were collected on a Buchner funnel, washed with ethanol, dried and recrystallized from butyl Cellosolve. They melted at 243–244° C. and were identified as 1-(3,4-dichlorobenzyl)-3-(2-cyclohexylidene-cyclohexylidene) urea. This new compound on analysis gave 63.13% carbon, 6.24% hydrogen, 7.48% nitrogen and 19.36% chlorine, as compared with the theoretical calculated for $C_{20}H_{24}N_2OCl_2$ of 63.32% carbon, 6.38% hydrogen, 7.39% nitrogen and 18.69% chlorine.

EXAMPLE XIII

*1 - (3,4 - dichlorobenzyl) - 3 - (2 - cyclohexylidene - cyclohexylidene) urea*

3,4-dichlorobenzylurea (10.25 parts), cyclohexanone (49 parts) and concentrated hydrochloric acid (5 parts) were kept under reflux for 30 minutes. A large amount of white crystals formed during the reaction. They were separated, washed with several portions of ethanol and dried. They melted at 243–244° C. and the melting range was not changed by recrystallization. A mixed melting point determination showed the identity of this product with the product described in Example XII. This compound on analysis gave 62.98% carbon, 6.42% hydrogen, 7.37% nitrogen and 19.11% chlorine as compared with the theoretical calculated for $C_{20}H_{24}N_2OCl_2$ of 63.32% carbon, 6.38% hydrogen, 7.39% nitrogen and 18.69% chlorine.

EXAMPLE XIV

*1 - (α - naphthyl) - 3 - (2 - cyclohexylidene - cyclohexylidene) urea*

α-Naphthylurea (15 parts), cyclohexanone (49 parts) and concentrated hydrochloric acid (8 parts) were refluxed together for one hour. After cooling water was added to the reaction mixture and the product was allowed to crystallize for 48 hours. The crystals were separated, washed and recrystallized twice from ethanol. They melted at 256–257° C. and were identified as 1-(α-naphthyl)-3-(2-cyclohexylidene-cyclohexylidene) urea. This new compound gave on analysis 79.65% carbon, 7.52% hydrogen and 8.14% nitrogen, as compared with the theoretical calculated for $C_{23}H_{26}N_2O$ of 79.73% carbon, 7.56% hydrogen and 8.09% nitrogen.

EXAMPLE XV

*1 - allyl - 3 - (2 - cyclohexylidene - cyclohexylidene) urea*

Allylurea (20 parts), cyclohexanone (49 parts) and concentrated hydrochloric acid (20 parts) were refluxed together for ninety minutes, and then left standing overnight at room temperature. After dilution with water the crystalline material was filtered off, washed with water and dried. After two recrystallizations from aqueous ethanol a very good yield of pure product was obtained, melting at 154–155° C. This new compound gave on analysis 73.97% carbon, 9.29% hydrogen and 11.05% nitrogen, as compared with the theoretical calculated for $C_{16}H_{24}N_2O$ of 73.80% carbon, 9.29% hydrogen and 10.76% nitrogen.

EXAMPLE XVI

*1 - (3,4 - dichlorophenyl) - 3 - (2 - cyclohexylidene - cyclohexylidene) urea*

3,4-dichlorophenylurea (6.15 parts), 2-cyclohexylidene cyclohexanone (5.34 parts) and concentrated hydrochloric acid (3 parts) were refluxed in dioxane (50 parts) for one hour and 35 minutes. After removing most of the solvent in vacuo, the separated crystals were collected by filtration and recrystallized three times from absolute ethanol. They melted then at 232–234° C. This new compound on analysis gave 62.75% carbon, 6.25% hydrogen, 7.92% nitrogen and 20.06% chlorine, as compared with the theoretical calculated for $C_{19}H_{22}N_2OCl_2$ of 62.47% carbon, 6.07% hydrogen, 7.67% nitrogen and 19.41% chlorine.

We claim:
1. A compound of the formula

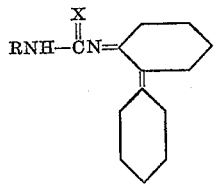

in which X is selected from the group consisting of S and O, and R is selected from the group consisting of hydrogen atom, ethyl, allyl, naphthyl, hexenyl, cyclohexenyl, benzyl, chlorobenzyl, dichlorobenzyl, hydroxybenzyl, phenyl, chlorophenyl, dichlorophenyl and hydroxyphenyl.

2. The compound 1-(2-cyclohexylidene cyclohexylidene)-3-allyl-urea.

3. The compound 1-(2-cyclohexylidene-cyclohexylidene)-3-allyl-thiourea.

4. The compound 1-(2-cyclohexylidene-cyclohexylidene)-thiourea.

5. The compound 1-(2-cyclohexylidene-cyclohexylidene)-3-phenyl-urea.

6. The compound 1-(2-cyclohexylidene-cyclohexylidene)-3-($\Delta^1$-cyclohexenyl)-urea.

7. A method of preparing a compound of the formula

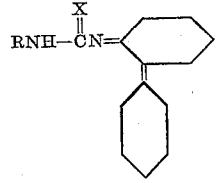

in which X is selected from the group consisting of S and O, and R is selected from the group consisting of hydrogen atom, ethyl, allyl, naphthyl, hexenyl, cyclohexenyl, benzyl, chlorobenzyl, dichlorobenzyl, hydroxybenzyl, phenyl, chlorophenyl, dichlorophenyl and hydroxyphenyl comprising heating together one of the group consisting of urea, thiourea, substituted urea, and substituted thiourea in which the substituent is one of the group consisting of ethyl, allyl, naphthyl, hexenyl, cyclohexenyl, benzyl, chlorobenzyl, dichlorobenzyl, hydroxybenzyl, phenyl, chlorophenyl, dichlorophenyl and hydroxyphenyl with one of the group consisting of cyclohexanone and 2-cyclohexylidene-cyclohexanone.

No references cited.